United States Patent Office 2,726,204
Patented Dec. 6, 1955

2,726,204

POLYMERIZATION PROCESS

Harold F. Park, East Longmeadow, and Charles Kilbourne Bump, Hampden, Mass., assignors to Monsanto Chemical Company, St. Louis, Mo., a corporation of Missouri No Drawing. Application April 14, 1949,
Serial No. 87,555

3 Claims. (Cl. 204—72)

This invention relates to the polymerization of unsaturated polymerizable materials in aqueous emulsion. More particularly, the invention pertains to a new method for catalyzing the polymerization of unsaturated monomers in aqueous emulsion.

One of the best methods for preparing polymers and copolymers of unsaturated polymerizable materials is to polymerize them in aqueous emulsion in the presence of an emulsifying agent and a polymerization catalyst. Various types of catalysts such as organic peroxides and salts of the per acids have been used with varying degrees of success. For the best results potassium or ammonium persulfate are frequently used.

There are disadvantages in the use of peroxide or per salts catalysts, among which are the residue which remains in the polymer at the end of the reaction and the difficulty of controlling the reaction rate. Various methods have been used to control the reaction rate such as step-wise addition of the catalyst during the course of the polymerization. The control of the reaction by these methods has been partially successful.

It is an object of this invention to provide a new method for catalyzing the aqueous emulsion polymerization of unsaturated polymerizable materials.

A further object is to provide a method for accurately controlling the aqueous emulsion polymerization of unsaturated polymerizable materials.

Still another object is to provide a process for polymerization of unsaturated polymerizable materials in aqueous emulsion in the absence of any added chemical catalyst.

These and other objects are attained by using an electrical current to catalyze the emulsion polymerization of polymerizable unsaturated monomers.

The following examples are given in illustration of this invention and are not intended as limitations upon the scope of the invention. Where parts are mentioned, they are parts by weight.

Example I

A glass-lined reaction vessel was coated on the inner surface with a thin film of polystyrene and then equipped with an agitator, a reflux condenser, a thermometer, an ingredient addition funnel and two carbon electrodes. The cathode and the electrolyte, in which the cathode was immersed, were contained in a cylinder of unglazed porcelain resting in the reaction vessel. 2 parts of dodecyl benzene sodium sulfonate were added to 1000 parts of water in the reaction vessel. The solution was refluxed for 10 minutes and then allowed to cool under an atmosphere of nitrogen. 1 part of hydrofluoric acid was added to the cooled solution. A potential of 8.5 volts was then applied to the two electrodes and 390 parts of styrene monomer were added to the solution with constant agitation. The resultant mixture was heated at 50° C. for about 12 hours under constant agitation and with a constant potential of 8.5 volts at the end of which time an aqueous emulsion of polymerized styrene was obtained.

The emulsion was resolved, by evaporation, in an oven at about 100° C. to obtain the dried resin. The resin was molded by compression molding method and was found to be colorless and free from haze. The molded articles were remarkably tough and hard and were impervious to boiling water.

When the above experiment was repeated, using .8 part of potassium persulfate as a catalyst without the use of electrical current, a resin was obtained which when molded was quite hazy. The molded article became white and opaque in boiling water.

Example II

A glass-lined reaction vessel was equipped with two lead electrodes. 6 grams of dioctyl succinate sodium sulfonate and .7 part of sulfur dioxide were dissolved in 1500 parts of water in the reaction vessel. The air above the solution was displaced with carbon dioxide and the solution was heated to 40° C. A potential of 1200 volts was applied to the electrodes and 100 parts of vinyl chloride monomer were added to the solution with constant agitation. The solution was then maintained at 40° C. for 8 hours with continued agitation and with a continual potential of 1200 volts to provide an aqueous emulsion of polymerized vinyl chloride. The water was removed from the resulting emulsion on a drum drier and the dried resin was molded by injection molding methods. The molded articles were clear and colorless and free from haze and had unusually good electrical properties.

The above experiment was repeated without the use of the electric current and without adding any of the conventional catalysts. Substantially no polymerization of the vinyl chloride took place during 8 hours at 40° C.

The process of this invention may be applied to the polymerization and copolymerization of substantially water-insoluble polymerizable materials in aqueous emulsion. Among the materials which may be so polymerized are vinylidene compounds, diolefins and polyolefins, etc. Specific examples of the polymerizable monomeric materials are: unsaturated hydrocarbons such as ethylene, propylene, butylene, isobutylene, amylene, butadiene, isoprene, dimethyl butadiene, piperylene, trienes, octadecatriene, vinyl benzene, divinyl benzene, trivinyl benzene, vinyl naphthalene, divinyl naphthalene, trivinyl naphthalene, vinyl anthracene, vinyl diphenyl, divinyl diphenyl, α-alkyl vinyl benzenes, α-methyl vinyl benzene, α-ethyl vinyl benzene, o-, m- or p-methyl vinyl benzenes, 2,3-, 2,4-, or 2,5-dimethyl vinyl benzenes, p-ethyl vinyl benzene, p-isopropyl vinyl benzene, α-methyl-p-methyl vinyl benzene, etc.; halogenated unsaturated hydrocarbons such as vinyl halides, vinyl fluoride, vinyl chloride, vinyl bromide, vinylidene halides, vinylidene chloride, vinylidene fluoride, vinylidene bromide, vinylidene fluorochloride, mono- and dihalo ring substituted styrenes, o-, m- or p-chlorostyrene, o-, m- or p-fluorostyrenes, 2,3-, 2,4- or 2,5-dichlorostyrenes, chloroprene, fluoroprene, etc.; unsaturated esters including vinyl acetate, vinyl butyrate, vinyl caproate, vinyl stearate, vinyl crotonate, vinyl tiglate, vinylidene acetate, allyl acetate, allyl propionate, methallyl butyrate, ethallyl acetate, methyl acrylate, methyl methacrylate, methyl propacrylate, methyl phenacrylate and the corresponding ethyl, propyl, octyl and phenyl etc. esters, dimethyl methylene malonate, diethyl methylene malonate, diethyl maleate, dimethyl fumarate, dibutyl itaconate, etc.; unsaturated nitriles including acrylonitrile, methacrylonitrile, ethacrylonitrile, α-phenyl acrylonitrile, cyanoprene, etc.; unsaturated ketones, methyl vinyl ketone, ethyl vinyl ketone, methyl allyl ketone, ethyl methallyl ketone, etc.; unsaturated ethers including vinyl methyl ether, vinyl ethyl ether, vinyl isopropyl ether, allyl methyl ether, allyl isopropyl ether, methallyl ethyl ether, divinyl ether, diallyl ether, etc.; polyhydric alcohol polyesters of acrylic and alpha substituted acrylic acids, etc.

Any of the well known emulsifying agents may be used to prepare the aqueous emulsions of this invention. Among such emulsifying agents are soaps such as sodium palmitate, sodium oleate, sodium stearate, sodium salts of coconut oil fatty acids, etc; alkali metal salts of sulfonated aromatic compounds such as alkali metal salts of naphthalene sulfonic acids, benzene sulfonic acids, etc.; alkali metal salts of aromatic sulfonic acids in which a long chain alkyl group is attached to the aromatic nucleus, including dodecyl benzene sodium sulfonate, hexadecyl benzene sodium sulfonate, octadecyl benzene sodium sulfonate, etc. Other conventional emulsifying agents such as sodium salts of mahogany acids and mixtures of emulsifying agents may be used.

Conventional additives such as lubricants, plasticizers, modifiers, dyes, pigments, etc., may be used. The additional ingredients may be added before the polymerization starts, during the polymerization or after the polymer emulsion is obtained.

The electric force which acts as the catalytic agent may be varied over a wide range from about 1.5 volts to 5000 volts or more and will depend somewhat on the nature of the monomer or monomer mixture being polymerized as well as on the emulsifying agent, electrolyte, etc. It has the particular advantage that catalytic action may be definitely and accurately controlled by altering the current potential during the course of the reaction or even by shutting off the supply of electric current completely if the reaction appears to be going too rapidly. Various electrodes may be used in the process of this invention such as platinum, lead, carbon, steel, nickel, etc. The cathode may be placed in a separate compartment, in a separate pool of electrolyte, or both electrodes may be inserted in the reaction medium. In some cases it may be essential to add an electrolyte such as hydrochloric acid, acetic acid, etc. to facilitate the passage of electric current through the reaction medium. In other cases, it is unnecessary to add an electrolyte.

The process of this invention makes it possible to catalyze the aqueous emulsion polymerization of unsaturated polymerizable materials without the addition to the reaction of chemical catalysts which leave a residue which may be detrimental to the polymerized resin. The process also has the distinct advantage that for the first time it is possible to maintain complete control of the catalytic activity in the reaction medium by merely varying the amount of electrical current.

It is obvious that many variations may be made in the process of this invention without departing from the spirit and scope thereof as defined in the appended claims.

What is claimed is:

1. A process for catalyzing the aqueous emulsion polymerization of substantially water-insoluble ethylenically unsaturated polymerizable monomers which comprises applying an electric potential to 2 electrodes immersed in the aqueous emulsion, said emulsion being electrically conductive and said electric potential causing electrolysis of the aqueous medium.

2. A process for polymerizing styrene in aqueous emulsion which comprises catalyzing the polymerization by means of an electric potential applied to 2 electrodes immersed in the aqueous emulsion, said emulsion being electrically conductive and said electric potential causing electrolysis of the aqueous medium.

3. A process for polymerizing vinyl chloride in aqueous emulsion which comprises catalyzing the polymerization by means of an electric potential applied to 2 electrodes immersed in the aqueous emulsion, said emulsion being electrically conductive and said electric potential causing electrolysis of the aqueous medium.

References Cited in the file of this patent

UNITED STATES PATENTS

| | | |
|---|---|---|
| 1,585,573 | Thomas | May 18, 1926 |
| 2,167,718 | Harris et al. | Aug. 1, 1939 |
| 2,197,768 | Pier et al. | Apr. 23, 1940 |
| 2,257,177 | Luster | Sept. 30, 1941 |
| 2,268,160 | Miles | Dec. 30, 1941 |
| 2,271,093 | Pier et al. | Jan. 27, 1942 |
| 2,288,392 | Davis | June 30, 1942 |
| 2,364,790 | Hemming | Dec. 12, 1944 |

FOREIGN PATENTS

| | | |
|---|---|---|
| 130,608 | Great Britain | July 11, 1921 |

OTHER REFERENCES

Narasimhamurty et al.: Industrial and Engineering Chem., vol. 26 (Aug. 1934), pp. 882–4.

Khain et al.: Chemical Abstracts, vol. 33 (1939), pp. 1912.

Shekhter et al.: Chemical Abstracts, vol. 34 (1940), pp. 5353.